US012152430B2

(12) United States Patent
Romero et al.

(10) Patent No.: US 12,152,430 B2
(45) Date of Patent: Nov. 26, 2024

(54) PARTICULATE-CAPTURING COVER FOR A MOVABLE BARRIER OPERATOR

(71) Applicant: Overhead Door Corporation, Lewisville, TX (US)

(72) Inventors: Federico Romero, Corpus Christi, TX (US); John M. Gollihar, II, Corpus Christi, TX (US)

(73) Assignee: Overhead Door Corporation, Lewisville, TX (US)

( * ) Notice: Subject to any disclaimer, the term of this patent is extended or adjusted under 35 U.S.C. 154(b) by 0 days.

(21) Appl. No.: 18/149,613

(22) Filed: Jan. 3, 2023

(65) Prior Publication Data

US 2024/0218721 A1 Jul. 4, 2024

(51) Int. Cl.
*E05F 15/643* (2015.01)
*E05F 7/00* (2006.01)

(52) U.S. Cl.
CPC .............. *E05F 7/00* (2013.01); *E05F 15/643* (2015.01); *E05Y 2800/12* (2013.01); *E05Y 2800/40* (2013.01); *E05Y 2900/132* (2013.01)

(58) Field of Classification Search
CPC ...... E05F 7/00; E05F 15/643; E05Y 2201/11; E05Y 2201/10
See application file for complete search history.

(56) References Cited

U.S. PATENT DOCUMENTS 5,797,471 A * 8/1998 Princell .................. B66B 13/08 187/324
6,098,341 A * 8/2000 Gebauer ............... E05F 15/652 49/362
6,516,566 B2 * 2/2003 Finke .................. E05D 15/0652 49/130
7,228,659 B2 * 6/2007 Romero .................. E05D 15/48 16/268
8,393,115 B2 * 3/2013 Schroder ............... E06B 7/2305 49/504
10,392,854 B2 * 8/2019 Ottmann ............. E05D 15/0652
11,414,911 B2 8/2022 Romero
2009/0077898 A1 * 3/2009 Gerichten ............. E05D 15/063 49/506
2018/0161831 A1 * 6/2018 Wang ...................... E05D 15/08
2021/0332632 A1 * 10/2021 Romero .............. E05D 15/0621

FOREIGN PATENT DOCUMENTS

DE 4308802 C5 12/2010
EP 3015634 A1 5/2016

OTHER PUBLICATIONS

The Hague, Extended European Search Report for European Application No. 23220740.7, European Patent Office, May 6, 2024, 9 pages.

* cited by examiner

*Primary Examiner* — Daniel J Troy
*Assistant Examiner* — Susan M. Heschel
(74) *Attorney, Agent, or Firm* — Haynes and Boone, LLP

(57) ABSTRACT

A cover for attachment to a header of a door system. The cover may have a motor compartment, a pulley compartment, and a first window. The motor compartment may be configured to at least partially enclose a motor and the pulley compartment may be configured to at least partially enclose a pulley, where the motor is operably attached to the pulley to drive a drive member. The first window may be configured to receive a portion of the drive member extending through an exterior wall of the cover.

17 Claims, 9 Drawing Sheets

PARTICULATE-CAPTURING COVER FOR A MOVABLE BARRIER OPERATOR

TECHNICAL FIELD

The present disclosure relates generally to the field of covers for use on movable barrier operators. In particular, the present disclosure relates to covers that are configured to capture particles produced during operation of a movable barrier operator, such as those which may be used in clean room applications.

BACKGROUND

Clean rooms are enclosed spaces that are designed to have a low concentration of airborne particles. Many applications such as semiconductor and pharmaceutical production are sensitive to contamination and, thus, require clean rooms to prevent high levels of airborne particles from lowering the quality or even damaging the products. Clean rooms generally have entrances that prevents particles from entering the space and have filtration systems that remove particles from the air.

Because minimizing particles is crucial to maintaining a clean room, entrances use movable barriers or door systems that are specifically designed to limit the number of particles that enter the clean room. These may use a variety of methods to prevent particles from the exterior of the clean room from moving into the clean room. For instance, during their operation, many types of doors can themselves produce particles that can contaminate the clean room. When parts of a door, and in particular parts of the door operator, move and rub against each other, debris and particles are created that can then become airborne.

Many clean room doors use a vacuum to suck up particles produced during operation of the door. However, these systems can be costly, difficult to install, and difficult to maintain. Moreover, when the vacuum is full and needs to be emptied or during other maintenance of the door operator, particles that were captured by the vacuum can be released into the air and may contaminate the clean room. Improved designs are needed to improve maintenance procedures of clean room doors as well as to decrease the cost and complexity of clean door systems.

SUMMARY

Some embodiments according to the present disclosure may include a cover for attachment to a header of a door system comprising a motor compartment, a pulley compartment, and a first window. The motor compartment may be configured to at least partially enclose a motor. The pulley compartment may be configured to at least partially enclose a pulley, where the motor is operably attached to the pulley to drive a drive member. The first window may be configured to receive a portion of the drive member extending through an exterior wall of the cover.

In some embodiments, the cover may also comprise a trapping material disposed over a gap formed at an interface between the cover and the header. The trapping material may be configured to capture debris generated by operation of the door system. In some embodiments, the cover may also include an opening and a cap covering the opening. In some embodiments, the cap may be slidable between an open position in which the opening is uncovered and a closed position in which the opening is covered by the cap. In some embodiments, the cover may also comprise an opening and a trapping material configured to capture debris generated by operation of the door system.

In some embodiments, the cover may also comprise a plurality of fins. The plurality of fins may be disposed adjacent the first window and configured to capture debris generated by operation of the door system. In some embodiments, at least one fin of the plurality of fins may be angled away from the first window. In some embodiments, the cover may also comprise a second window disposed in an interior wall of the cover, where the second window is aligned with the first window. There may be a fin compartment defined between the first window and the second window and the plurality of fins may be disposed in the fin compartment. In some embodiments, the fin compartment may comprise a top wall and a bottom wall extending between the exterior wall and the interior wall. In some embodiments, a first set of fins of the plurality of fins may be disposed on the bottom wall of the fin compartment. In some embodiments, a second set of fins of the plurality of fins may be disposed on the top wall of the fin compartment. In some embodiments, the first set of fins may be horizontally offset from the second set of fins.

In some embodiments, the first window may be disposed horizontally from the pulley compartment. In some embodiments, the motor compartment may be disposed at least partially above the pulley compartment. In some embodiments, the motor compartment is open toward the pulley compartment. In some embodiments, the motor compartment and the pulley compartment may form a single contiguous volume. In some embodiments, the motor compartment and the pulley compartment may be fully or partially separated by a wall or barrier. In some embodiments, the cover may also comprise a third window configured to receive a second portion of the drive member extending through a second exterior wall of the cover. In some embodiments, the third window is disposed in a part of the cover defining the motor compartment. The third window may be disposed horizontally from the motor compartment. The third window may be disposed vertically above the first window.

Some embodiments of the present disclosure may include a door system that comprises a motor for moving a door, a drive pulley operatively coupled to the motor, an idler pulley, a drive member extending between the drive pulley and the idler pulley, a first cover, and a second cover. The first cover may be secured to a header and may enclose the motor, the drive pulley, and a first portion of the drive member between the first cover and the header. The first cover may comprise a motor compartment housing the motor and a first window configured to receive a portion of the drive member extending through an exterior wall of the first cover. The second cover may enclose the idler pulley and a second portion of the drive member. The second cover may be configured to capture debris generated by the operation of the door system.

In some embodiments, the first cover may also include a plurality of fins disposed adjacent the first window and configured to capture debris generated by operation of the door system. In some embodiments, at least one fin of the plurality of fins may be angled away from the first window. In some embodiments, the first cover may also comprise a second window laterally offset from the first window. The fin compartment may be formed between the first window and the second window with the plurality of fins disposed within the fin compartment. In some embodiments, the fin compartment may be defined by a top wall, a bottom wall, the exterior wall, and an interior wall. The first window may be disposed in the exterior wall and the second window may be disposed in the interior wall.

Some embodiments according to the present disclosure may include a door system having a motor for moving a door, a drive pulley operatively coupled to the motor, an idler pulley, a drive member extending between the drive pulley and the idler pulley, a motor compartment configured to be disposed around a part of the motor, a drive pulley compartment configured to be disposed around a part of the drive pulley, and a first window configured to receive a portion of the drive member.

In some embodiments, the door system may include a plurality of fins disposed adjacent the first window and configured to capture debris generated by operation of the door system. In some embodiments, the door system may also include a second window laterally offset from the first window. A fin compartment may be formed between the first window and the second window with the plurality of fins disposed within the fin compartment. In some embodiments, the fin compartment may be defined by a top wall, a bottom wall, an exterior wall, and an interior wall. The first window may be disposed in the exterior wall and the second window may be disposed in the interior wall.

Some embodiments of the present disclosure may include a door system having an automatic door operator with a plurality of moving parts and a particulate capturing housing configured to cover a portion of the automatic door operator. The particulate capturing housing may be configured to capture debris generated by operation of the plurality of moving parts. The portion of the automatic door operator covered by the particulate capturing housing may include at least one moving part of the plurality of moving parts.

It is to be understood that both the foregoing general description and the following drawings and detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following. One or more features of any implementation or aspect may be combinable with one or more features of other implementation or aspect.

BRIEF DESCRIPTION OF THE DRAWINGS

The accompanying drawings illustrate implementations of the systems, devices, and methods disclosed herein and together with the description, serve to explain the principles of the present disclosure.

Figure 1A:
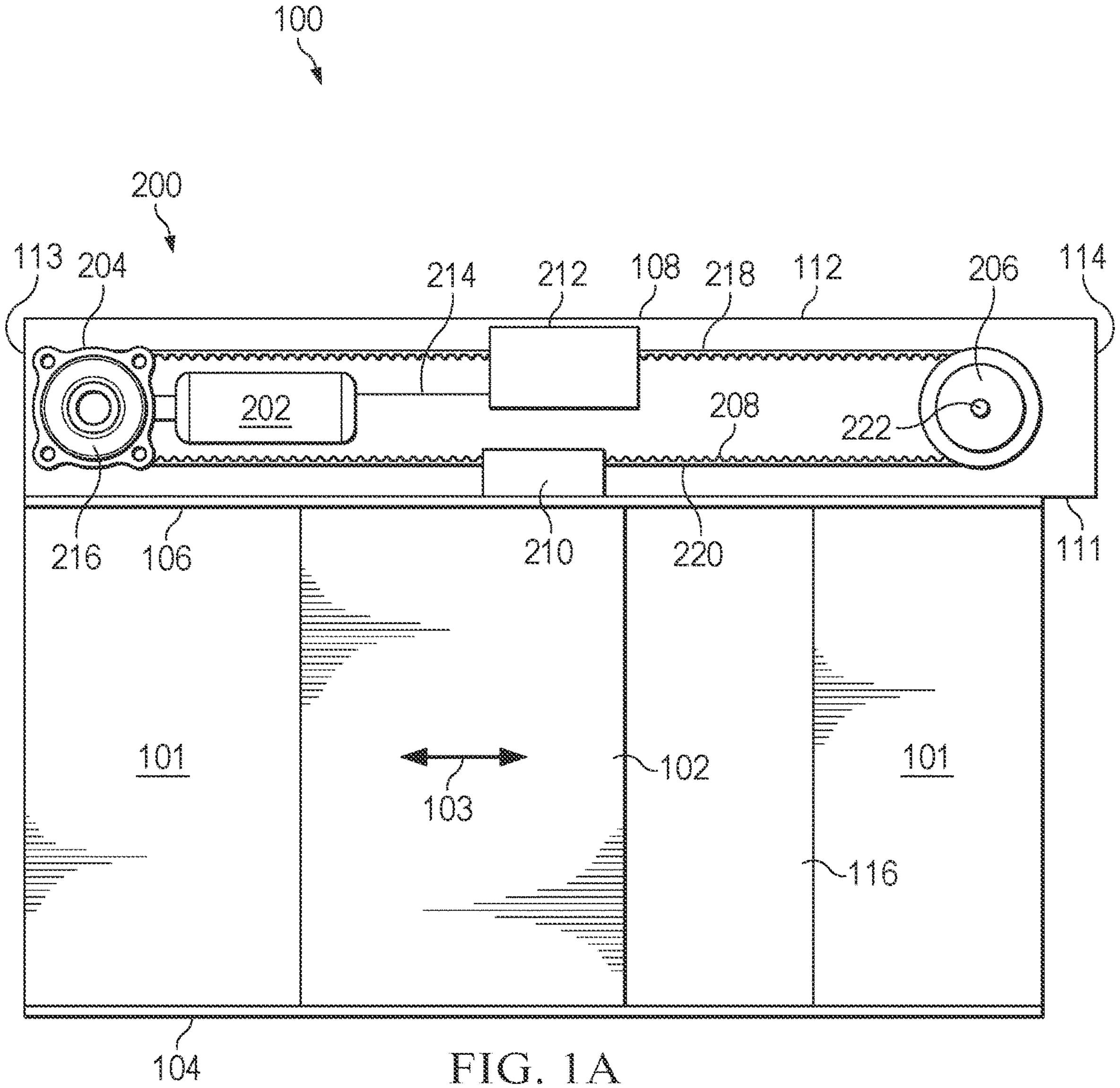
FIG. 1A is a diagrammatic representation of a door system according to aspects of the present disclosure, with covers removed to reveal internal components.

These Figures will be better understood by reference to the following detailed description.

DETAILED DESCRIPTION

For the purpose of promoting an understanding of the principles of the present disclosure, reference will now be made to the implementations illustrated in the drawings and specific language will be used to describe them. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In addition, this disclosure describes some elements or features in detail with respect to one or more implementations or Figures, when those same elements or features appear in subsequent Figures, without such a high level of detail. It is fully contemplated that the features, components, and/or steps described with respect to one or more implementations or Figures may be combined with the features, components, and/or steps described with respect to other implementations or Figures of the present disclosure. For simplicity, in some instances the same or similar reference numbers are used throughout the drawings to refer to the same or like parts.

In some aspects, the present disclosure relates to an improved door system, and, in particular, one that includes improved door operator covers that minimize the number of particles distributed into a surrounding environment during operation of the door system. In some embodiments, the improved door system described herein may be used as a movable barrier for a clean room, although other applications are contemplated.

The door system includes a door operator assembly that moves a door or other barrier to open and close an opening. In some embodiments, the door operator system includes a drive pulley and an idler pulley spaced from the drive pulley with a drive member disposed around the pulleys. A motor may be operably coupled to the drive pulley to rotate the drive pulley and thereby move the drive member around the pulleys. A coupling mechanism may couple the drive member to the door so that the door can be opened and closed via operation of the motor.

During operation of the door operator assembly, debris or particles may be created by the parts moving and rubbing against each other. Thus, the door system may include covers that enclose particle-producing parts to reduce the quantity of particles released into the surrounding area. In many applications, excess debris or particles may impact the quality or even the functioning of certain technologies. For example, in semiconductor or pharmaceutical manufacturing, debris or particles may cause damage to the products. Therefore, it is desirable to minimize the number of particles that are released into the surroundings by operation of the door. The covers described herein may provide improved particle capture without use of additional particle-evacuation technologies or systems like vacuums.

According to some aspects of the present disclosure, a drive cover may be sized and shaped to cover the motor, drive pulley, and a portion of the drive member to capture particles produced during operation of the door. The drive cover may have a motor compartment and a drive pulley compartment for covering the motor and drive pulley, respectively. Moreover, the drive cover may also comprise a plurality of fins that are disposed in a fin compartment, through which part of the drive member may pass. As the drive member moves, the particles that are generated by friction and rubbing between interacting components can be captured by the fins so that the particles do not exit the drive cover and move into the surrounding space. There may also be an idler pulley cover sized and shaped to cover the idler pulley and another portion of the drive member. The idler pulley cover, which may or may not also include fins, may also capture particles produced by movement of the idler pulley and drive member. These covers may improve the capture of particles produced by the door operator without use of a particle evacuation system such as a vacuum.

FIG. 1A illustrates a door system 100 according to one embodiment of the present disclosure. The door system 100 is illustrated and described as a sliding door system, but the present disclosure is similarly applicable to other door systems such as swing doors. Example of sliding door systems are provided in U.S. Pat. No. 7,228,659 or U.S. Publication No. 2021/0332632, which are both incorporated herein in their entirety. The door system 100 includes a door opening 116 with a header 108 above the door opening 116. In the illustration shown, the door opening 116 is formed between two walls or wall-like structures 101 on either side of the door opening 116. The header 108 has a bottom 111, a top 112, a left side 113, and a right side 114. The illustrated embodiment of the door system 100 includes one door 102 that can slide laterally to cover the opening 116, as indicated by the arrows 103. However, other embodiments may contain two opposing doors 102 or may contain a telescoping door arrangement with more than two doors 102. There is a bottom rail 104 disposed on the floor and a top rail 106 disposed at the bottom 111 of a header 108. The bottom of the door 102 engages the bottom rail 104 and the top of the door 102 engages the top rail 106 so that the rails guide the door 102 as it slides horizontally.

The door system 100 has a door operator assembly 200 that drives movement of the door 102. The door operator assembly 200 is located in the header 108 at the top of the door 102. The door operator assembly 200 includes a motor 202 that is operably coupled to a drive pulley 204, both of which are located on the left side 113 of the header 108. The motor 202 may be connected to the drive pulley 204 via any appropriate means, including, for example, a drive unit 216. The motor 202 may move the drive unit 216 to rotate the drive pulley 204. There is an idler pulley 206 located on the right side 114 of the header 108 opposite the drive pulley 204. In some embodiments, the idler pulley 206 may be affixed to the header 108 or an idler pulley holder via an axle 222 such that the idler pulley 206 can rotate around the axle 222. A drive member 208 is looped around the drive pulley 204 and the idler pulley 206. The drive member 208 may be, for example, a belt, a chain, or any other appropriate drive member. In some implementations, the drive member may be a rubberized or polymeric belt or chain. In some cases, the drive member 208 may not be looped around the pulleys 204, 206, but may be wrapped around each pulley 204, 206 separately or may be arranged in any appropriate manner. A coupling mechanism 210 couples the door 102 to the drive member 208 such that movement of the drive member 208 causes corresponding movement of the door 102.

The motor 202 is coupled to control circuitry 212 that controls operation of the motor 202. The control circuitry 212 may receive commands from any appropriate source, for example, from a door sensor, from a remote device (ex. an RF transmitter or a wireless phone), or a wired connection to an input device (ex. button or keypad). The control circuitry 212 may then operate the door in accordance with those commands. For example, the control circuitry 212 may open or close the door 102, control the speed of door 102 movement, or control the position of the door 102. The control circuitry may have a processor that can receive signals from a sensor or other device, transmit electrical signals to the motor, analyze signals to determine how to operate the motor, or may perform any other appropriate task.

To open the door 102, the control circuitry 212 operates the motor 202 such that the motor 202 will rotate the drive pulley 204 in a first direction. For example, in one embodiment, the motor 202 may rotate the drive pulley 204 in a clockwise direction to open the door 102, but in another embodiment the motor 202 may rotate the drive pulley 204 in a counterclockwise direction to open the door 102. As the drive pulley 204 rotates, the drive pulley 204 moves the drive member 208 such that the drive member 208 moves the coupling mechanism 210 in a first horizontal direction to move the door 102 along the rails 104, 106 into an open position. In this embodiment, the drive member 208 moves the coupling mechanism 210 to the left, thereby opening the door 102. In other embodiments, the coupling mechanism 210 may move the coupling mechanism 210 to the right to open the door 102.

The idler pulley 206 ensures that the drive member 208 is properly aligned and helps to retain tension in the drive member 208. In some embodiments, the idler pulley 206 may move with the drive member 208 but is not directly powered by a motor. In other embodiments, the motor 202 or a second motor may be operatively coupled to the idler pulley 206 so that it can help move the drive member 208.

To close the door 102, the control circuitry 212 may control the motor 202 to rotate the drive pulley 204 in the opposite direction. For example, in one embodiment, the motor 202 may rotate the drive pulley 204 in a counterclockwise direction to close the door 102, but in another embodiment the motor 202 may rotate the drive pulley 204 in a clockwise direction to close the door 102. The drive pulley 204 will move the drive member 208 such that the drive member 208 moves the coupling mechanism 210 in the opposite horizontal direction to move the door 102 along the rails 104, 106 into a closed position. In this embodiment, the drive member 208 moves the coupling mechanism 210 to the right, thereby closing the door 102. In other embodiments, the coupling mechanism 210 may move the coupling mechanism 210 to the left to close the door 102.

Although the illustrated embodiment shows the motor 202 and drive pulley 204 as being on the left side 113 of the header 108 and the idler pulley 206 on the right side 114 of the header 108, the motor 202, drive pulley 204, and idler pulley 206 may be in any appropriate location. For example, the motor 202 and drive pulley 204 may be located on the right side 114 of the header 108 and the idler pulley 206 may be located on the left side 113 of the header 108. Additionally, the motor 202 and drive pulley 204 may be located in the center of the header 108 with the idler pulley 206 on the left side 113 or the right side 114 of the header 108, or vice versa.

Figure 1B:
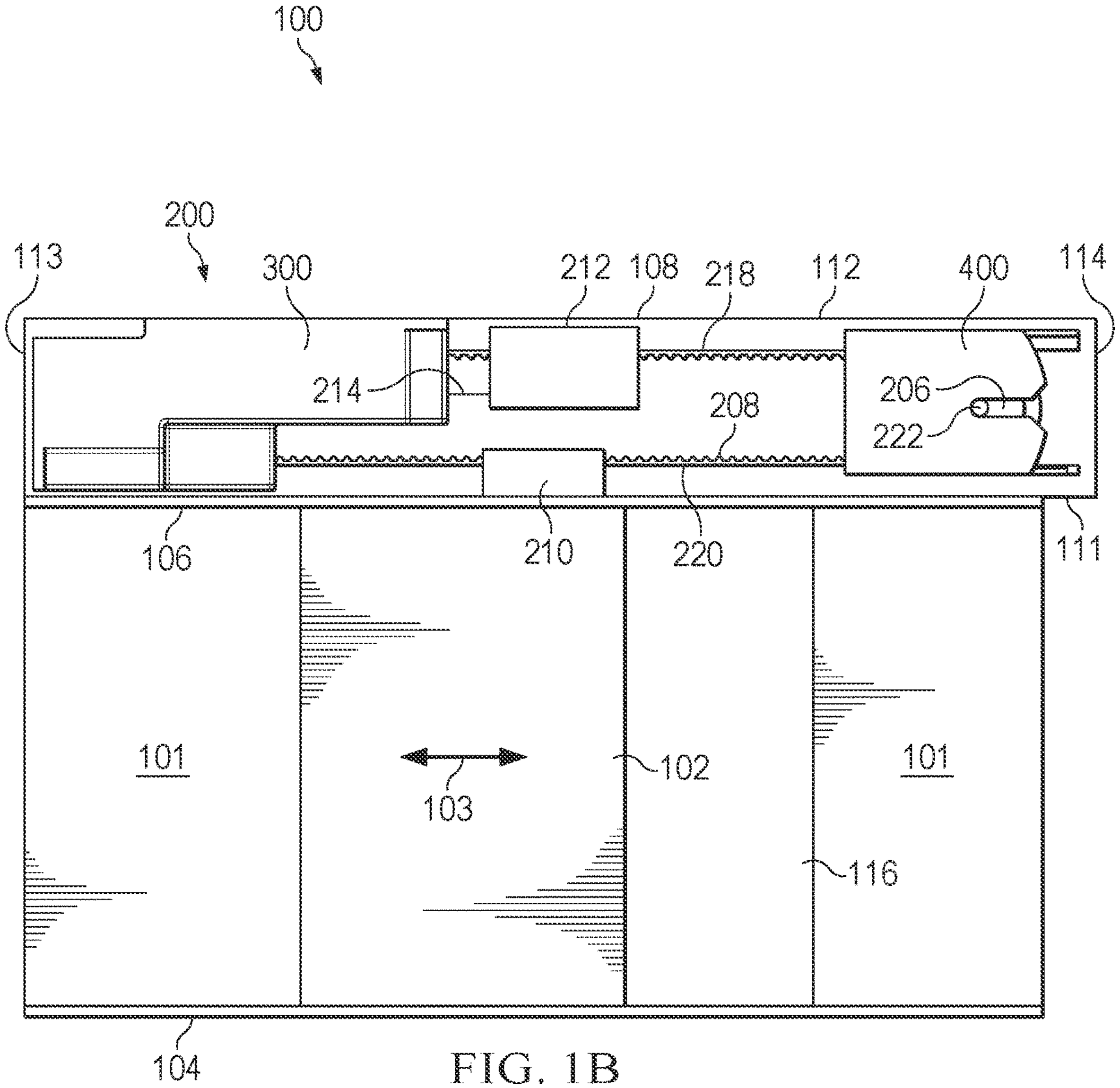
FIG. 1B is a diagrammatic representation of a door system including covers according to aspects of the present disclosure.

FIG. 1B shows the door system 100 of FIG. 1A but with two covers 300, 400 over parts of the door operator assembly 200. The drive cover 300 is attached to the header 108 such that it partially or fully covers the motor 202, the drive pulley 204, and a portion of the drive member 208. The idler cover 400 is attached to the header 108 such that it partially or fully covers the idler pulley 206 and another portion of the drive member 208. These covers are designed to capture debris or particles created by the motor 202 and pulleys 204, 206 during operation of the door operator assembly 200, as described in more detail below.

Figure 2A:
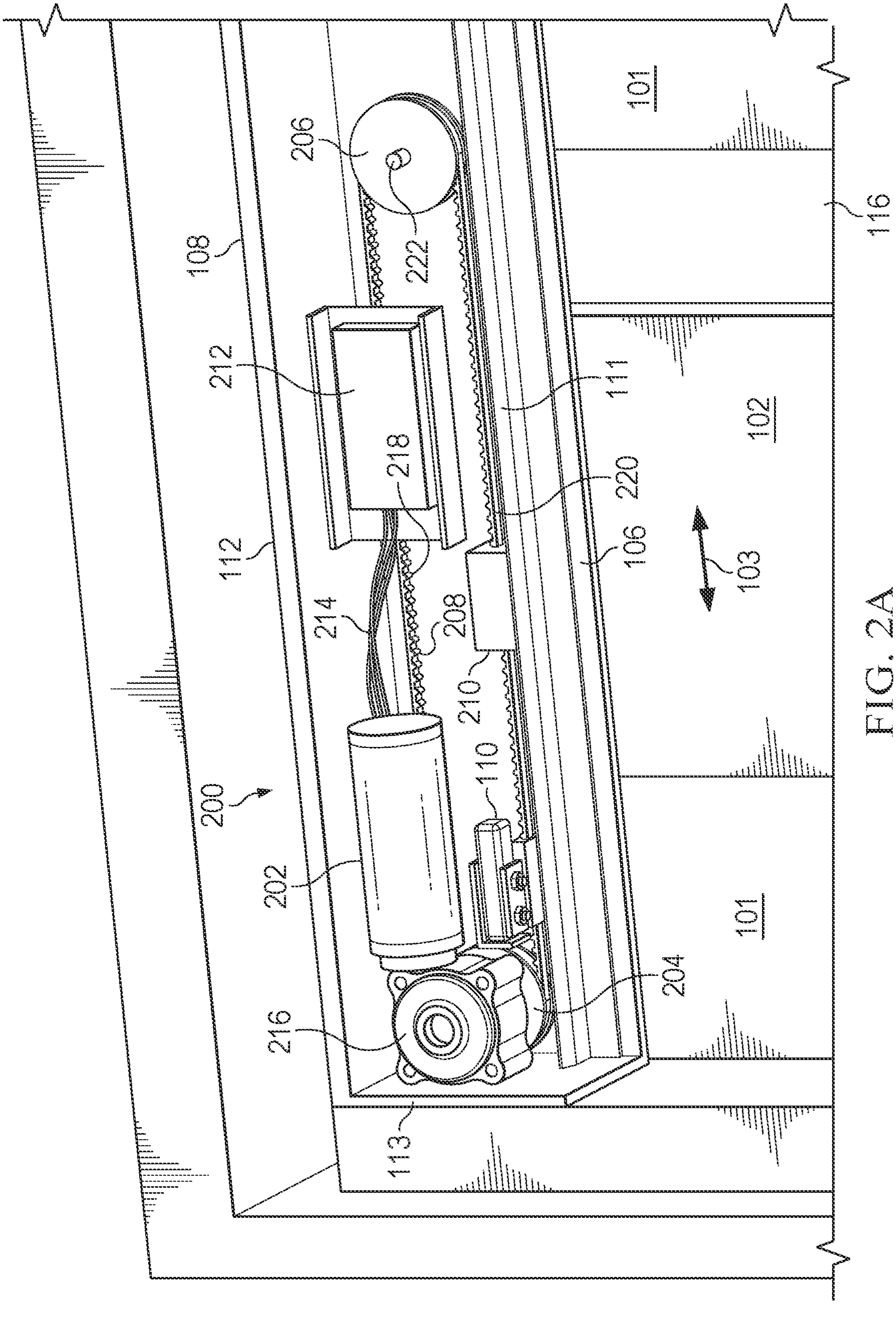
FIG. 2A is a perspective view of a door operator assembly, according to aspects of the present disclosure, with covers removed to reveal internal components.

FIG. 2A illustrates the uncovered door operator assembly 200. The control circuitry 212 is connected to the motor 202 via one or more wires 214. The control circuitry 212 may control operation of the motor 202 by sending electrical signals to the motor 202 via the wires 214. These electrical signals may control the motor 202 to rotate the drive pulley 204 in one direction or the other, may control how fast the motor 202 rotates the drive pulley 204, may indicate how long the motor 202 will rotate the drive pulley 204, or may control the motor 202 in any other appropriate way.

Figure 2B:
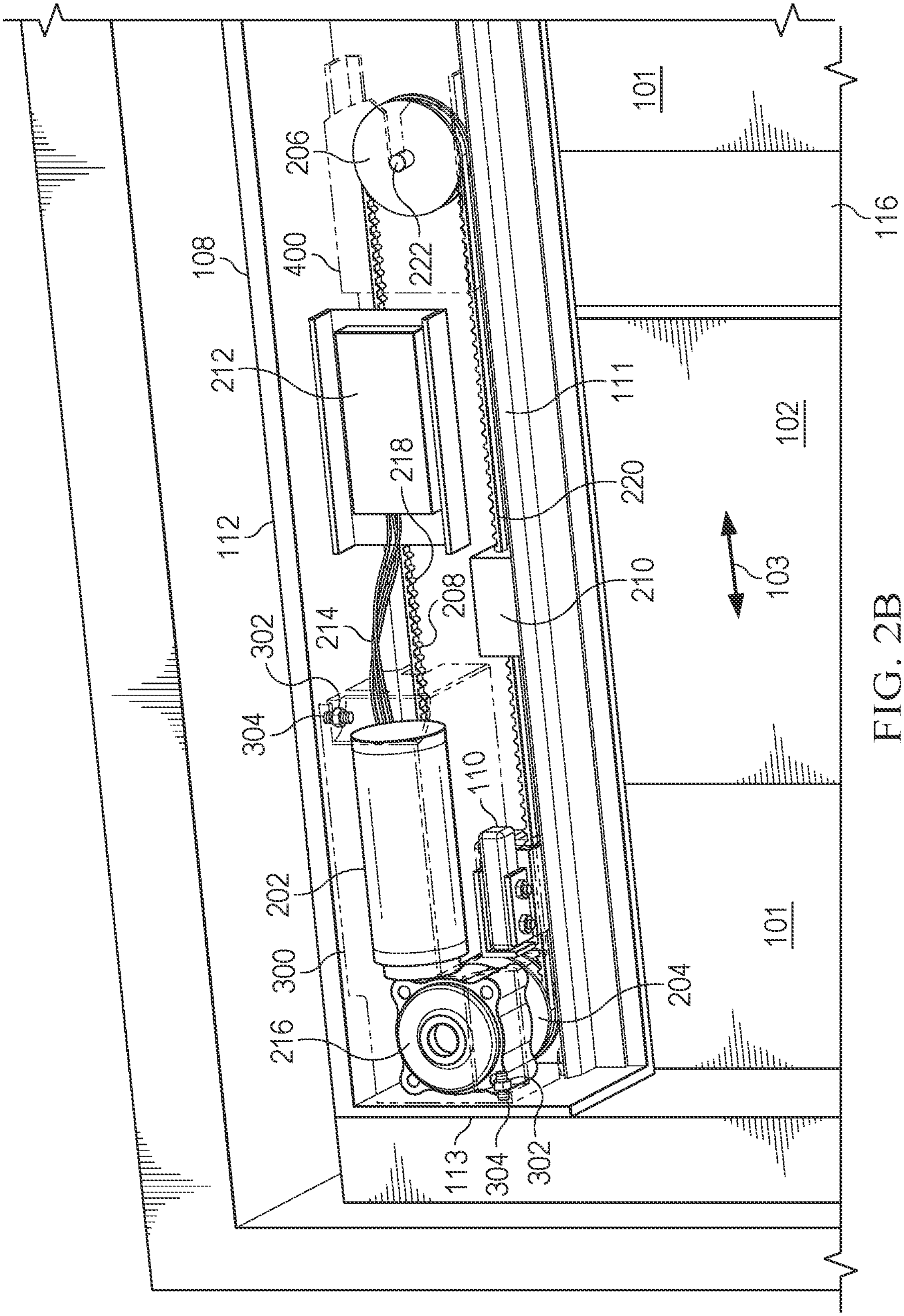
FIG. 2B is a perspective view of a door operator assembly including covers according to aspects of the present disclosure.
Figure 2C:
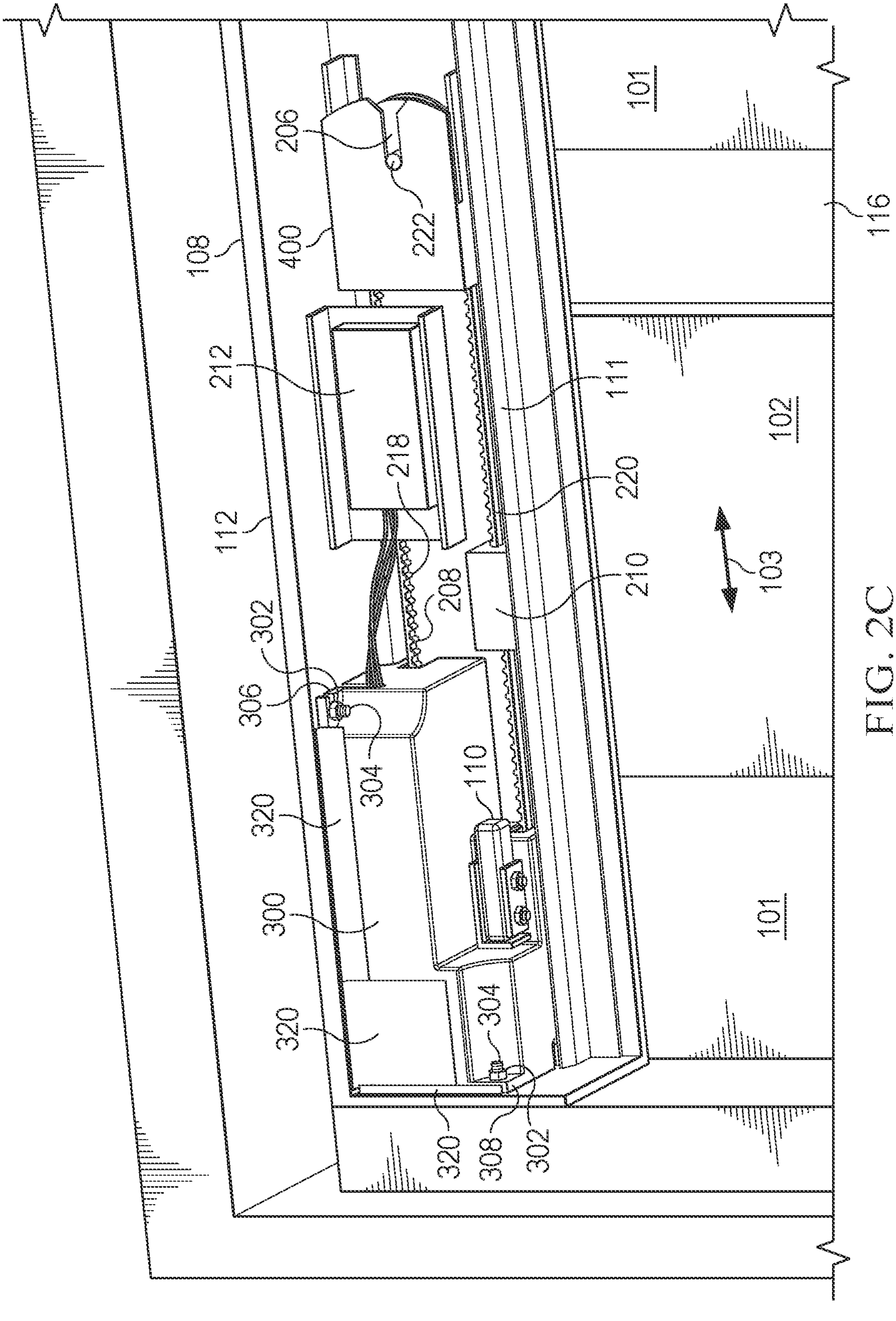
FIG. 2C is a perspective view of a door operator assembly including covers according to aspects of the present disclosure.

In this embodiment, the door system 100 also includes a door stopper 110 located below the motor 202 along the bottom 111 of the header 108. When the door operator assembly 200 opens the door 102, the door stopper 110 may contact the coupling mechanism 210 to prevent the coupling mechanism 210 from traveling too far. Thus, the door stopper 110 may prevent the coupling mechanism 210 from hitting and damaging the drive pulley 204, getting stuck between the drive pulley 204 and the drive member 208, or pushing the drive member 208 off of the drive pulley 204. The door stopper 110 may also prevent the door 102 from opening too far and contacting a wall or other object adjacent to the door FIGS. 2B and 2C show the same part of the door operator assembly 200 shown in FIG. 2A, but with the drive cover 300 attached to the header 108 over the motor 202, drive pulley 204, and part of the drive member 208. In FIG. 2B the drive cover 300 is transparent to illustrate the positioning of the cover with respect to the other components. The drive cover 300 may be affixed to the header 108 by any appropriate means. In the illustrated embodiment, the header 108 is attached to the header 108 via a nut 302 and bolt 304. The drive cover 300 has a side attachment 306 and a top attachment 308. A nut 302 and bolt 304 may be used to attach the side attachment 306 and the top attachment 308 to the left side 113 and top 112 of the header respectively. In some embodiments, the drive cover 300 may have one attachment or more than two attachments. In other embodiments, the attachments may attach to other parts of the header 108 including the bottom 111, right side 114, the front, or the back of the header 300, or to a wall or ceiling. Moreover, the drive cover 300 may have any combination of attachments which attach to any combination of parts of the header 108.

In some embodiments, a trapping material 320 (or other seal) may be affixed to the exterior of the drive cover 300 and/or idler cover 400. The trapping material 320 may be used to cover openings or small gaps between the drive cover 300 and the header 108, wall, and/or ceiling to form a seal around the drive cover 300. By covering these openings and gaps with the trapping material 320, the trapping material 320 can capture particles or debris that would otherwise escape the interior of the drive cover 300. Trapping material 320 may be used on part or all of the exterior of the drive cover 300. In some embodiments, the trapping material 320 may cover all of the gaps or openings or only some of the gaps or openings. The trapping material 320 may be any appropriate material. The trapping material 320 may be, for example, any tacky, porous, fibrous, or filter-like material capable of capturing particles. For example, the trapping material 320 may be an adhesive (such as, for example, tape or glue), Velcro, cloth, fabric, sponge, foam (e.g., polyurethane foam, an open cell foam), or any other appropriate tacky, porous, fibrous, or filter-like material. In some embodiments, the trapping material may be a replaceable component configured to be replaced with a relatively low cost at periodic intervals or as-needed based on use and/or condition.

Figure 3A:
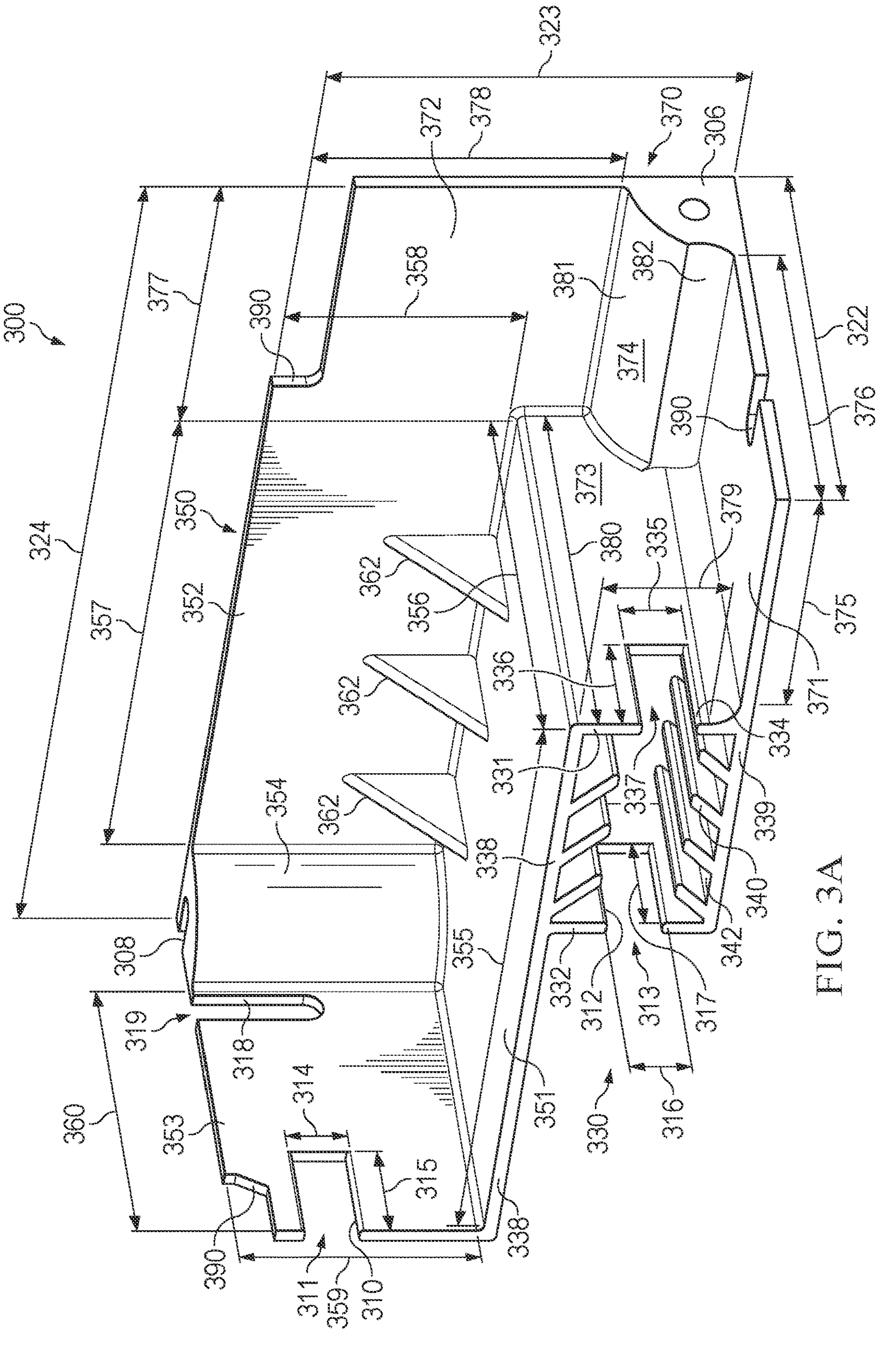
FIG. 3A is a perspective rear view of a drive cover, according to aspects of the present disclosure.
Figure 3B:
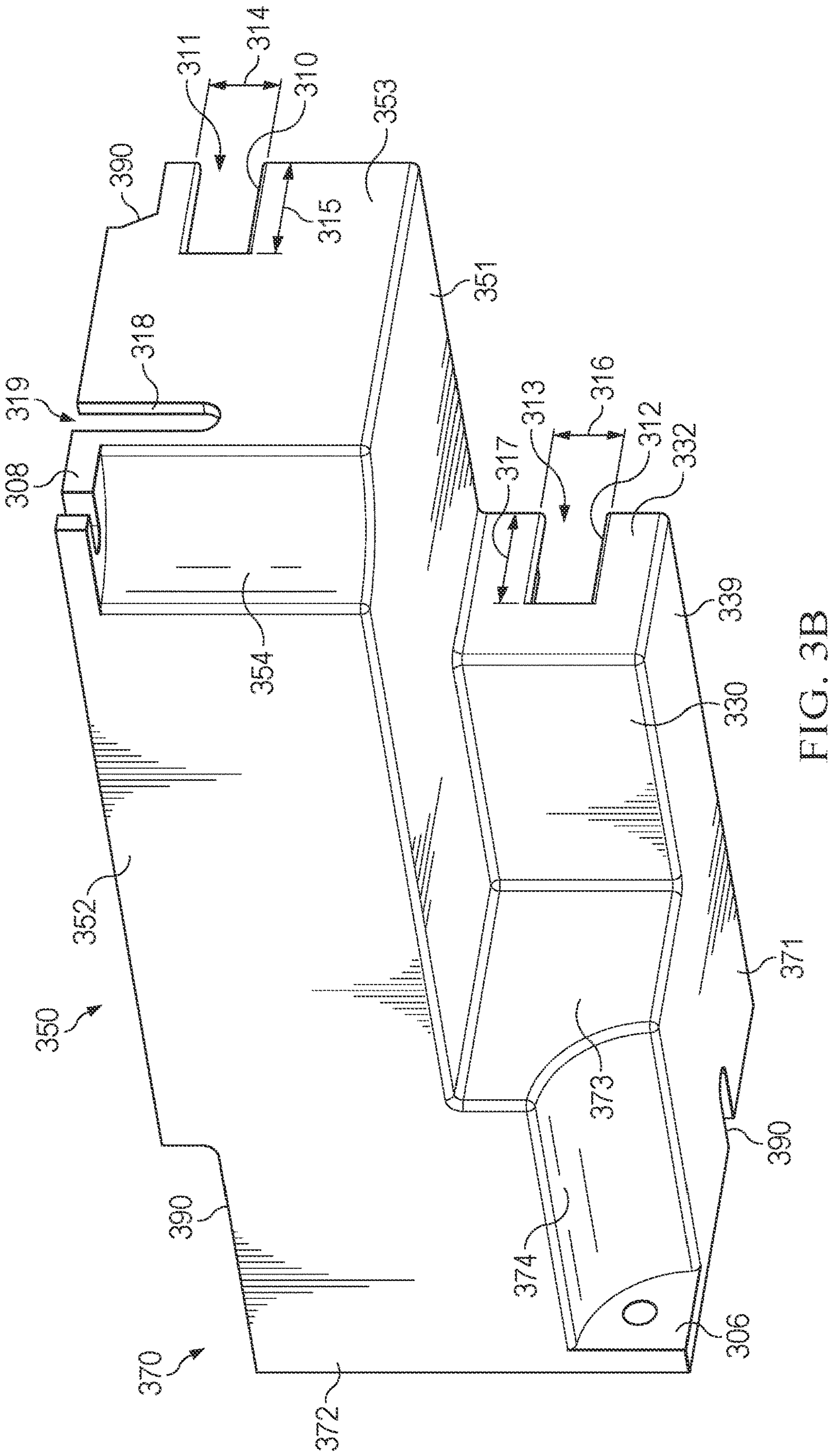
FIG. 3B is a perspective front view of a drive cover, according to aspects of the present disclosure.
Figure 4A:
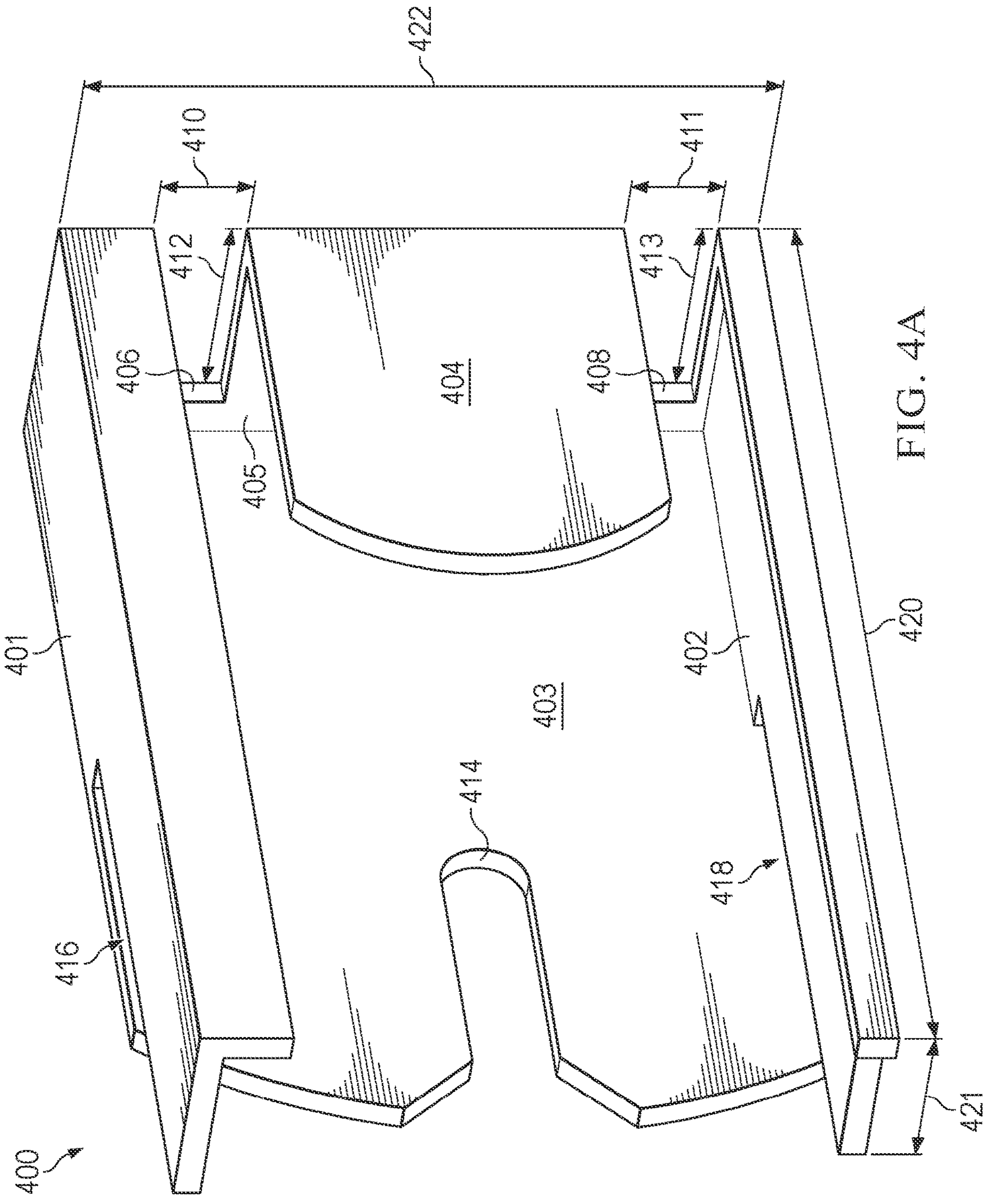
FIG. 4A is a perspective rear view of an idler pulley cover, according to aspects of the present disclosure.
Figure 4B:
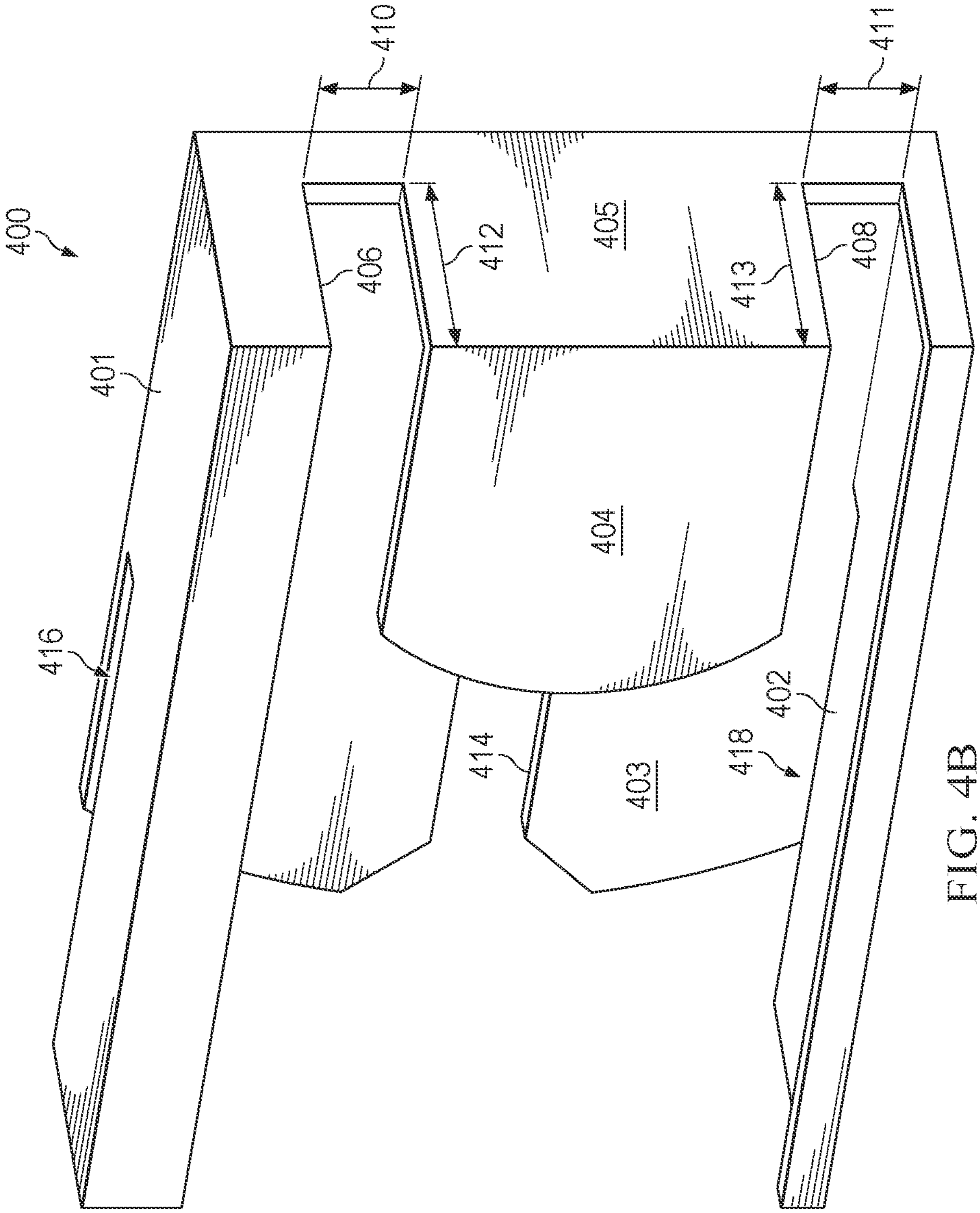
FIG. 4B is a perspective rear view of an idler pulley cover, according to aspects of the present disclosure.

FIGS. 3A and 3B show the drive cover 300 in accordance with some embodiments of the present disclosure. FIG. 3A shows a perspective back view of the drive cover 300 and FIG. 3B shows a perspective front view of the drive cover 300.

The drive cover 300 may have one or more compartments for receiving portions of the door operator assembly 200. In some embodiments, the drive cover 300 may have a motor compartment 350 which is shaped to cover the motor 202.

Additionally, the drive cover 300 may have a drive pulley compartment 370 shaped to cover the drive pulley 204. The drive cover 300 may also have one or more windows through which the drive member 208 can pass. In the illustrated embodiment, there is a top window 310 on the upper part of the drive cover 300 a bottom window 312 disposed on the lower part of the drive cover 300. The top window 310 and bottom window 312 may be vertically spaced, may be horizontally spaced, or may be both horizontally and vertically spaced. The top window 310 may be shaped such that a top section 218 of the drive member 208 loop can pass through the it. Similarly, the bottom window 312 may be shaped such that a bottom section 220 of the drive member 208 loop can pass through it. The drive cover 300 can also have a wire opening 318 through which the wiring 214 can pass to connect the motor 202 and the control circuitry 212.

The motor compartment 350 has a bottom 351, a front 352, and a side 353, which define an interior space that is shaped to receive the motor 202. The motor compartment 350 may also have a curved corner 354 that connects the side 353 of the motor compartment 350 to the front 352. The curved corner 354 may extend inwards towards the interior of the motor compartment 350 as in the illustrated embodiment to form an access channel in an exterior of the cover, allowing for installation and removal of a fastener from an exterior of the cover. In some embodiments, the corner 354 may not be curved.

The bottom 351 of the motor compartment 350 may have a length 355 and a width 356. The length 355 and width 356 may be any suitable value. The front 352 of the motor compartment 350 may have a length 357 and a height 358. The length 357 and height 358 may be any appropriate value. The side 353 of the motor compartment 350 may have a height 359 and a width 360. The height 359 and width 360 may be any appropriate value. These dimensions may correspond the dimensions of the motor 202 and drive pulley 204. In some embodiments, the dimensions of the motor compartment 350 may allow for any amount of space desirable around the motor 202. For example, the size of the motor compartment 350 may allow for a certain amount of clearance between the walls 351, 352, 353 of the motor compartment 350 and the motor 202. In some embodiments, the size of the motor compartment 350 may allow for a clearance around the motor 202 in a range of 1/16 inches to ½ inches. In some embodiments, the clearance around the motor 202 may be ⅛ inches. In some embodiments, it may be desirable to have the dimensions of the motor compartment 350 closely conform to the shape and size of the motor and/or associated components to minimize the volume of space occupied by the drive cover 300.

In some embodiments, there may be one or more supports 362 in the drive cover 300 to improve the rigidity of the cover. In the illustrated example, there are three supports 362 that each contact the bottom 351 and front 352 of the motor compartment 350. In other embodiments, there may be one support or may be more than three supports. In some embodiments, supports may be disposed between the bottom 351 and the side 353 of the motor compartment, the side 353 and the front 352 of the motor compartment 350 or between any two or more surfaces. The supports 362 may be triangularly shaped, but, in other embodiments, the supports 362 may be any appropriate shape, including, for example, curved, square, or hexagonal. The supports 362 may be any appropriate size. For example, in some embodiments, the height of the supports 362 may be in a range of 10% to 40% of the height 358 of the front 352 of the motor compartment 350. In some embodiments, the height of the supports 362 may be approximately 25% of the height 358 of the front 352 of the motor compartment 350. The supports 362 may increase the structural integrity of the motor compartment 350 and, thus, the drive cover 300. In some embodiments, the supports 362 may trap particles or debris in spaces between and/or adjacent to the supports so that the particles or debris do not exit the motor compartment 350. Moreover, the supports 362 may structurally reinforce the cover to prevent the warping or deforming of the cover 300. This may be particularly advantageous, for example, in embodiments in which the cover 300 is pliable during manufacturing, such as is injection molding.

The drive pulley compartment 370 has a bottom 371, a front 372, and a side 373, which define an interior space that is shaped to receive the drive pulley 204. The drive pulley compartment 370 may also have a curved corner 374 that connects the bottom 371 of the drive pulley compartment 370 to the front 372. The curved corner 374 may extend inwards towards the interior of the drive pulley compartment 370 In some embodiments, the corner 374 may not be curved, but may be a flat surface. In other embodiments, there may be no curved corner 374 and the bottom 371 and front 372 of the drive pulley compartment 370 will meet at a straight or rounded corner. In yet other embodiments, the curved corner 354 may have a curved section and a flat surface, may have two separate flat surfaces, or may have any appropriate combination of any appropriate type of surfaces.

The bottom 371 of the drive pulley compartment 370 may have a length 375 and a width 376. The length 375 and width 376 may be any appropriate value. The front 372 of the drive pulley compartment 370 may have a length 377 and a height 378. The length 377 and height 378 may be any appropriate value. The side 373 of the drive pulley compartment 370 may have a height 379 and a width 380. The height 379 and width 380 may be any appropriate value. These dimensions may closely match the dimensions of the drive pulley 204 to allow for as little space as possible around the drive pulley 204. In some embodiments, the dimensions of the drive pulley compartment 370 may allow for any amount of space desirable around the drive pulley 204. For example, the size of the drive pulley compartment 370 may allow for a desired amount of clearance between the walls 371, 372, 373 and the drive pulley 204. In some embodiments, the size of the drive pulley compartment 370 may allow for a clearance around the drive pulley 204 in a range of 1⁄16 inches to ½ inches. In some embodiments, the clearance around the drive pulley 204 may be ⅛ inches. In some embodiments, it may be desirable to have the dimensions of the drive pulley compartment closely conform to the shape and size of the drive pulley and/or associated components to minimize the volume of space occupied by the drive cover 300.

Although not shown, it is contemplated that there may be supports 362 between any combination of the bottom 371, front 372, or side 373 of the drive pulley compartment 370. As described above, the supports 362 may be any appropriate shape, including, for example, triangle, curved, square, or hexagonal. Moreover, the supports 362 may be any appropriate size. The supports 362 may increase the structural integrity of the drive pulley compartment 370 and, thus, the drive cover 300. Moreover, there may be supports 362 may be used in the drive pulley compartment 370 to capture particles or debris created during movement of the motor 202, drive pulley 204, and drive member 208. Moreover, in embodiments where the cover 300 is injection molded, the supports 362 may prevent warping or deforming of the cover 300.

In some embodiments, the motor compartment 350 and the drive pulley compartment 370 may be separate compartments divided by an interior wall with an opening through which the motor 202 in the motor compartment 350 can be connected to the drive pulley 204 in the drive pulley compartment 370 via the drive unit 216. In some embodiments, the motor compartment 350 and the drive pulley compartment 370 are interconnected such that the motor compartment 350 and open into each other such that they form a single interior space, as shown in the illustrated embodiment. The front 352 of the motor compartment 350 and the front 372 of the drive pulley compartment 370 are a part of a single surface. The bottom 371 of the drive pulley compartment 370 is sunken (or at a lower elevation) with respect to the bottom 351 of the motor compartment 350 such that the side 373 of the drive pulley compartment 370 connects the bottom 351 of the motor compartment 350 and the bottom 371 of the drive pulley compartment 370. Therefore, the width 356 of the bottom 351 of the motor compartment 350 may be the same as the width 380 of the side 373 of the drive pulley compartment 370, and thus, may correspond to a width 322 of the overall drive cover 300. Similarly, a combination of the height 379 of the side 373 of the drive pulley compartment 370 and the height 359 of the side 353 of the motor compartment will add up to a height 323 of the overall drive cover 300. Moreover, a combination of the length 375 of the bottom 371 of the drive pulley compartment 370 and the length 355 of the bottom 351 of the motor compartment 350 may add up to a total length 325 of the drive cover 300.

Although the motor compartment 350 may be designed to receive the motor 202 and the drive pulley compartment 370 may be designed to receive the drive pulley 204, the motor 202 may be partially housed in the drive pulley compartment 350 or the drive pulley 204 may be partially housed in the motor compartment 350. In some embodiments, the drive cover 300 may not have separate defined compartments for the motor 202 and drive pulley 204 and may instead be one single compartment. The drive cover 300 may be generally rectangular such that there is one flat bottom surface. The fin compartment 330 may be located on the bottom surface or in any appropriate location.

As discussed earlier, the drive cover 300 has a top window 310 (or "opening") and a bottom window 312 that are sized and shaped so that the drive member 208 can pass through an exterior wall of the cover to engage the drive pulley within the cover. The windows 310, 312 are sized so that the height 314, 316 of the windows 310, 312 generally corresponds to the thickness of the drive member 208 and the width 315, 317 of the windows 310, 312 generally corresponds to the width of the drive member 208 as possible while still allowing the drive member 208 to move through the windows 310, 312 with no, or minimal, contact between the drive member and the cover. This prevents particles or debris generated by operation of the door from escaping out of the drive cover 300 as the drive member 208 moves. In some embodiments, the height 314, 316 of the windows 310, 312 may exceed the thickness of the drive member 208. In some embodiments, the width 315, 317 of the windows 310, 312 may exceed the width of the drive member 208. In some embodiments, the height 314 of the top window 310 and the height 316 of the bottom window 312 are the same; however, the height 314 of the top window 310 may be greater or less than the height 316 of the bottom window 312. In some embodiments, the width 315 of the top window 310 and the width 317 of the bottom window 312 are the same; however, the width 315 of the top window 310 may be greater or less than the width 317 of the bottom window 312.

In the illustrated embodiment, the top window 310 is located on the side 353 of the motor compartment 350 on the end such that the top window 310 is open on one side 311 forming a U-shaped channel. This may facilitate installation and removal of the cover with the drive member in place on the pulleys. When the drive cover 300 is affixed to the header 108, the open side 311 of the top window 310 contacts the back of the header 108, enclosing a portion of the drive member between the cover and the header. However, the top window 310 may be located on any part of the drive cover 300. Moreover, the top window 310 may not have an open side 311 and instead may have four closed sides.

In some embodiments, there may be one or more fin compartments 330 in the drive cover 300. The illustrated fin compartment 330 is defined by an interior wall 331 and an exterior wall 332 on the sides, by the top wall 338 and the bottom wall 339 of the drive pulley compartment vertically, and by the wall defining the front 352 of the motor compartment. When the cover is installed, a surface of the header may form a rear wall of the fin compartment 330. The bottom window 312 is disposed on the exterior wall 332 of the fin compartment 330 and a fin compartment window 334 is disposed on the interior wall 331. In the illustrated embodiment, the fin compartment 330 is located adjacent to the side 373 of the drive pulley compartment 370 below the bottom 351 of the motor compartment 350, such that the interior wall 331 of the fin compartment 330 is a part of the side 373 of the drive pulley compartment 370 and the fin compartment window 334 is disposed on the side 373 of the drive pulley compartment 370. Thus, the fin compartment 330, the fin compartment window 334, and the bottom window 312 may be horizontally aligned with a part of the drive pulley compartment 370.

The fin compartment window 334 and the bottom window 312 may be sized and shaped similar to the top window 310. In the illustrated embodiment, the bottom window 312 and the fin compartment window 334 are aligned such that the drive member 208 can pass straight through both windows. In some embodiments, the bottom window 312 may be higher or lower than the fin compartment window 334 or may be more to one side or the other of the fin compartment window 334.

There may be one or more fins 340 disposed within the fin compartment 330. The fins 340 may extend from one or more of the top wall 338, the bottom wall 339, and/or the front wall of the fin compartment 330. In some embodiments, fins 340 may extend from the interior wall 331 and/or exterior wall 332 wall of the fin compartment 330. In the illustrated embodiment, there are three fins 340 on the top wall 338 of the fin compartment 330 and four fins on the bottom wall 339. However, there can be any number of fins 340 on any part of the fin compartment 330. For example, there may be 0, 1, 2, 4, 5, 6, 7, 8, 9, or 10 fins 340 on the top wall 338 and 0, 1, 2, 3, 4, 5, 6, 7, 8, 9, or 10 fins 340 on the bottom wall 339. The fins 240 on the top wall 338 may be horizontally offset from the fins 340 on the bottom wall 339. In some embodiments, the fins 240 on the top wall 338 may be aligned with the fins 340 on the bottom wall 339

The fins 340 are angled away from the exterior wall 332 of the fin compartment 330. The fins 340 can be angled at any appropriate angle, including, for example 1, 10, 15, 20, 25, 30, 45, 50, 55, 60, 65, 70, 75, 80, 85, or 89 degrees measured from the vertical. In some embodiments, the fins 340 may be vertical (0 degrees) or may be flat (90 degrees). In other embodiments, the fins 340 may be angled away from the interior wall 331 of the fin compartment 330 at any appropriate angle.

The fins 340 may be configured to capture debris or particles generated during operation of the drive assembly 200 to prevent the debris or particles from escaping from the drive cover 300. As the motor 202 rotates the drive pulley 204 and the drive pulley 204 moves the drive member 208, debris or particles may be generated as the parts move against each other. As the drive member 208 moves, it may pull debris or particles with it. The debris or particles may be disposed on the drive member 208 itself or may be carried by an air current generated by movement of the drive assembly 200. Thus, the fins 340 may be shaped, sized, and angled to create pockets 342 that capture debris or particles. The fins 340 may direct airflow into the pockets 342 so that the debris or particles riding on the air currents are directed into the pockets 342 and thus do not flow to the exterior of the drive cover 300.

In some embodiments, there may be no interior wall 331 or fin compartment window 334 and the fin compartment 330 may be open to or interconnected with the motor compartment 350 and/or the drive pulley compartment 370. The fin compartment 330 may be located anywhere in the drive cover 300. For example, the fin compartment 330 may be located adjacent to the top window 310 such that the fins 340 can collect debris or particles from the top section 218 of the drive member 208. Moreover, there may be more than one fin compartment 330 including, for example, a fin compartment 330 located adjacent to both the top window 310 and the bottom window 312. In some embodiments, the drive cover 300 may not have a fin compartment 330. There may be fins 340 on any part of the drive cover 300 including adjacent to the top window 310 or the bottom window 312.

The drive cover 300 may also comprise a wire opening 318 through which one or more wires 214 can pass between the motor 202 and the control circuitry 212. The wire opening 318 may be sized so that the dimensions are as close to the size of the wires 214 as possible so that there is as little a gap as possible between the wiring 214 and the wire opening 318. This prevents particles or debris generated by operation of the door from escaping out of the drive cover 300 as the drive member 208 moves. In some embodiments, the wire opening 318 may be larger or smaller. Moreover, there may be multiple wire openings 318 through which wires 214 can pass. Each wire opening 318 may fit one wire 214 or may fit more than one wire 314. In the illustrated embodiment, the wire opening 318 is disposed on the side 353 of the motor compartment 350. However, the wire opening 318 may be disposed on any other part of the drive cover 300, including, for example, the front 352 or bottom 351 of the motor compartment 350. The wire opening 318 may be open on one side 319 such that when the drive cover 300 is affixed to the header 108, the open side 319 contacts the top 112 of the header 108. In some embodiments, there is no open end 319 and the wire opening 318 is enclosed.

The drive cover 300 may have one or more vents 390 that open to the exterior of the drive cover 300. The vents 390 may be located on any appropriate part of the drive cover 300. In the illustrated embodiment, a first vent 390 is located on the top of the side 353 of the motor compartment 350, a second vent 390 is located at the top of the front 372 of the drive pulley compartment 370 and a third vent 390 is located on the bottom 371 of the drive pulley compartment 370. In some embodiments, the vents 390 may be located on the front 352 or bottom 351 of the motor compartment 350, may be located on the side 373 of the drive pulley compartment 370, or on part of the fin compartment 330. The vents 390 in the illustrated embodiment are located on the ends of the side 353, top 372, and bottom 371 such that the vents 390 are open on at least one side. Thus, the open sides of the vents 390 are disposed adjacent to the top 112 or left side 113 of the header 108. The vents 390 may be sized and shaped such that they can be covered by a trapping material 320 positioned on an external surface of the cover. The vents 390 may expose the trapping material 320 toward the internal compartment(s) of the cover such that the particles generated during movement of the motor 202, drive pulley 204, drive member 208, etc. can contact and be captured by the trapping material 320. In some embodiments, the vents 390 may be covered by a cap. In some embodiments, the cap may be slidable or otherwise moveable between an open position in which the vent 390 is uncovered and a closed position in which the vent 390 is covered. For example, a cap may be sized and shaped to snap-fit into a corresponding vent. In this way, the vents 390 may allow for improved particle capture. Moreover, as the motor 202 and other parts of the drive assembly 202 produce heat, the vents 390 may allow the heat to escape from the drive cover 300, thus cooling the motor 202 and other parts of the drive assembly 202. Additionally, in embodiments in which the vents 390 are covered by a trapping material 320, such as for example, tape, or a cap, the vents 390 may permit service personnel to access the interior of the cover 300, without removing the cover 300, to apply suction to vacuum particulate from the cover 300 before it is removed. In this manner, accumulated particulate may be removed from the cover before the cover 300 is removed to prevent dispersion of the particulate into the environment.

The door system 100 also includes an idler pulley cover 400 disposed over the idler pulley 206. The idler pulley cover 400 includes a top 401, bottom 402, front 403, back 404, and side 405. The back 404 of the idler pulley cover 400 may abut the back of the header 108 when the idler pulley cover 400 is disposed over the idler pulley 206.

There is a top window 406 and a bottom window 408 disposed on the side 405 of the idler pulley cover 400. The top window 310 and a bottom window 312 may be sized and shaped so that the drive member 208 can pass through it. The windows 406, 408 are sized so that the heights 410, 411 of the windows 406, 408 correspond to the thickness of the drive member 208 and the widths 412, 413 of the windows 406, 408 correspond to the width of the drive member 208 while still allowing the drive member 208 to move through the windows 406, 408. This prevents particles or debris generated by operation of the door assembly 200 from escaping out of the idler pulley cover 400 as the drive member 208 moves. In some embodiments, the height 410, 411 of the windows 406, 408 may exceed the thickness of the drive member 208. In some embodiments, the widths 412, 413 of the windows 406, 408 may exceed the width of the drive member 208. In some embodiments, the height 410 of the top window 406 and the height 411 of the bottom window 408 are the same; however, the height 410 of the top window 406 may be greater or less than the height 411 of the bottom window 408. In some embodiments, the width 412 of the top window 406 and the width 413 of the bottom window 408 are the same; however, the width 412 of the top window 406 may be greater or less than the width 413 of the bottom window 408.

The idler pulley cover 400 may have an axle opening 414 where an end of the axle 222 of the idler pulley 206 can pass through. In some embodiments, the axle opening 414 may be a slot and the end of the axle 222 may slide through the slot as the idler pulley cover 400 slides over the idler pulley 206. Thus, the idler pulley cover 400 may be slid over the idler pulley 206.

The idler pulley cover 400 may have a top opening 416 disposed on the top 401 and a bottom opening 418 disposed on the bottom 402. These openings 416, 418 provide clearance for the components of the idler pulley 206. In some embodiments, the openings 416, 418 may be sized and shaped to allow clearance for a mounting bracket for the idler pulley 206.

The idler pulley cover 400 has a length 420, a width 421, and a height 422. The dimensions 420, 421, 422 of the idler pulley cover 400 may be sized to allow for a desired amount of clearance around the idler pulley 206. For example, the size of the idler pulley cover 400 may allow for a certain amount of clearance between the walls 401, 402, 403, 404, 405 and the idler pulley 206. In some embodiments, the size of the idler pulley cover 400 may allow for a clearance around the idler pulley 206 in a range of $1/16$ inches to $1/2$ inches. In some embodiments, the clearance around the idler pulley 206 may be $1/8$ inches.

In some embodiments, a trapping material (not shown) may be affixed to the exterior of the idler pulley cover 400. The trapping material may be used to cover openings or small gaps between the idler pulley cover 400 and the header 108 to seal the idler pulley cover 400. By covering these openings and gaps with a trapping material, the trapping material can capture particles or debris that escape the interior of the idler pulley cover 400. The trapping material may be used on part or all of the exterior of the idler pulley cover 400. In some embodiments, the trapping material may cover all of the gaps or openings or only some of the gaps or openings. The trapping material may be any tacky, porous, fibrous, or filter-like material capable of capturing particles. In some embodiments, the trapping material may be a replaceable component configured to be replaced with a relatively low cost at periodic intervals or as-needed based on use and/or condition.

The drive cover 300 and the idler pulley cover 400 may be formed from any appropriate material(s). For example, the covers 300, 400 may be stainless steel, aluminum, plastic, rubber, foam, adhesive, cloth, or any appropriate material capable of capturing particles. In some embodiments, the covers 300, 400 may include plastic which may be formed by injection molding or additive manufacturing. In some embodiments, one or both of the covers 300, 400 may include a rigid skeletal structure covered by a particulate filtering or capturing material, such as cloth, to form the walls. In some embodiments, the covering material over or within the skeletal structure may be a replaceable component configured to be replaced with a relatively low cost at periodic intervals or as-needed based on use and/or condition. The covers 300, 400 may be manufactured by any appropriate method. For example, in some embodiments, the covers 300, 400 may be 3D printed. In other embodiments, the covers 300, 400 may be injection molded or cast. Moreover, any of the parts of the drive cover 300 may be composed of separate pieces or may be formed in part by the drive cover 300 and in part by a part of the header 108.

The door systems 100 described herein may capture significant amounts of particles such that the door systems 100 can be classified under ISO 14644-1 Cleanroom Standards or US FED STD 209E Cleanroom Standards. In some embodiments, door systems 100 may be classified as ISO 1, ISO 2, ISO 4, ISO 5, ISO6, ISO 7, ISO 8, of ISO 9 under ISO 14644-1 Cleanroom Standards. For example, a door system 100 according to the present disclosure may be classified as ISO 3.

In the embodiments described herein, the door system 100 is described as a sliding door system. However, it is contemplated that the door system 100 may also be any other type of movable barrier including, for example, a swing door as described in U.S. Pat. No. 11,414,911, the entirety of which is incorporated herein by reference.

Persons of ordinary skill in the art will appreciate that the implementations encompassed by the present disclosure are not limited to the particular exemplary implementations described above. In that regard, although illustrative implementations have been shown and described, a wide range of modification, change, combination, and substitution is contemplated in the foregoing disclosure. It is understood that such variations may be made to the foregoing without departing from the scope of the present disclosure. Accordingly, it is appropriate that the appended claims be construed broadly and in a manner consistent with the present disclosure.

What is claimed is:

1. A cover for attachment to a header of a door system comprising:
- a motor compartment configured to at least partially enclose a motor;
- a pulley compartment configured to at least partially enclose a pulley, wherein the motor is operably attached to the pulley to drive a drive member;
- a first window configured to receive a portion of the drive member extending through an exterior wall of the cover;
- a second window disposed in an interior wall of the cover, the second window being aligned with the first window; and
- a plurality of fins disposed adjacent the first window and configured to capture debris generated by operation of the door system, wherein a fin compartment is defined between the first window and the second window, the plurality of fins being disposed in the fin compartment.

2. The cover of claim 1, further comprising a trapping material disposed over a gap formed at an interface between the cover and the header, wherein the trapping material is configured to capture debris generated by operation of the door system.

3. The cover of claim 1, wherein the cover further comprises:
- an opening extending through the cover; and
- a cap covering the opening.

4. The cover of claim 3, wherein the cap is slidable between an open position in which the opening is uncovered and a closed position in which the opening is covered by the cap.

5. The cover of claim 1, wherein the cover further comprises:
- an opening extending through the cover; and
- a trapping material configured to capture debris generated by operation of the door system.

6. The cover of claim 1, wherein at least one fin of the plurality of fins is angled away from the first window.

7. The cover of claim 1, wherein the fin compartment comprises a top wall and a bottom wall extending between the exterior wall and the interior wall.

8. The cover of claim 7, wherein a first set of fins of the plurality of fins is disposed on the bottom wall of the fin compartment.

9. The cover of claim 8, wherein a second set of fins of the plurality of fins is disposed on the top wall of the fin compartment.

10. The cover of claim 9, wherein the first set of fins is horizontally offset from the second set of fins.

11. The cover of claim 1, wherein the first window is disposed horizontally from the pulley compartment.

12. The cover of claim 1, wherein the motor compartment is disposed at least partially above the pulley compartment.

13. The cover of claim 1, wherein the motor compartment is open toward the pulley compartment.

14. A cover for attachment to a header of a door system comprising:
- a motor compartment configured to at least partially enclose a motor;
- a pulley compartment configured to at least partially enclose a pulley, wherein the motor is operably attached to the pulley to drive a drive member;
- a first window configured to receive a portion of the drive member extending through an exterior wall of the cover; and
- a second window configured to receive a second portion of the drive member extending through a second exterior wall of the cover, wherein the second window is disposed on a part of the motor compartment.

15. The cover of claim 14, wherein the second window is disposed vertically above the first window.

16. A door system comprising:
- a motor for moving a door;
- a drive pulley operatively coupled to the motor;
- an idler pulley;
- a drive member extending between the drive pulley and the idler pulley;
- a motor compartment configured to be disposed around a part of the motor;
- a drive pulley compartment configured to be disposed around a part of the drive pulley;
- a first window configured to receive a portion of the drive member;
- a plurality of fins disposed adjacent the first window and configured to capture debris generated by operation of the door system; and
- a second window laterally offset from the first window, wherein a fin compartment is formed between the first window and the second window with the plurality of fins disposed within the fin compartment.

17. The door system of claim 16, wherein the fin compartment is defined by a top wall, a bottom wall, an exterior wall, and an interior wall, wherein the first window is disposed in the exterior wall and the second window is disposed in the interior wall.

* * * * *